United States Patent
Anderson (10) Patent No.: US 7,415,333 B2
(45) Date of Patent: Aug. 19, 2008

(54) MANAGEMENT OF VEHICLES BASED ON OPERATIONAL ENVIRONMENT

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 622 days.

(21) Appl. No.: 11/088,715

(22) Filed: Mar. 24, 2005

(65) Prior Publication Data

US 2006/0217993 A1   Sep. 28, 2006

(51) Int. Cl.
*G01M 17/00* (2006.01)

(52) U.S. Cl. .............................. 701/29; 701/33; 700/32

(58) Field of Classification Search ................ 340/989, 340/933; 701/29, 33; 700/32
See application file for complete search history.

(56) References Cited

U.S. PATENT DOCUMENTS

| | | | |
|---|---|---|---|
| 6,609,051 B2 * | 8/2003 | Fiechter et al. ............... | 701/33 |
| 7,155,321 B2 * | 12/2006 | Bromley et al. ............... | 701/29 |
| 2004/0167689 A1 * | 8/2004 | Bromley et al. ............... | 701/29 |
| 2004/0267395 A1 * | 12/2004 | Discenzo et al. .............. | 700/99 |
| 2005/0146428 A1 * | 7/2005 | Mahoney et al. ............ | 340/521 |
| 2006/0004499 A1 * | 1/2006 | Trego et al. .................... | 701/29 |
| 2006/0189292 A1 * | 8/2006 | Ueda et al. ................... | 455/307 |

OTHER PUBLICATIONS

Deitel, H.M., An Introduction to Operating Systems; Addison-Wesley Publishing Company (1983); pp. 165-171 and 249-263.

* cited by examiner

*Primary Examiner*—Mark Hellner (57) ABSTRACT

A method and system for managing fleet health of vehicles comprises gathering environmental data for potential mission locations. A data processing system collects vehicle data, including historical use data and maintenance data associated with corresponding vehicular components of vehicles within a fleet. A mission planner establishes a list of candidate missions for the fleet of vehicles. A stress module assigns a stress severity indicator to the established candidate missions based on the environmental data. The mission planner matches vehicles to corresponding missions based on the collected vehicle data and the stress severity indicator such that the matched vehicles are likely to complete the missions with a desired degree of reliability.

19 Claims, 5 Drawing Sheets

Fig. 5 ved for by the terms of Prime Cooperative Agreement No. N00014-99-2-0005awarded by the Office of Naval Research.
MANAGEMENT OF VEHICLES BASED ON OPERATIONAL ENVIRONMENT The U.S. Government has a paid-up license in this invention and the right in limited circumstances to require the patent owner to license others on reasonable terms as provided for by the terms of Prime Cooperative Agreement No. N00014-99-2-0005awarded by the Office of Naval Research.

FIELD OF THE INVENTION

This invention relates to the management of vehicles based on an operational environment.

BACKGROUND OF THE INVENTION

Weather or environmental factors may impact when a vehicle may fail and experience unscheduled downtime. Harsh weather can cause a spike in demand for parts and repairs that are stressed by weather. Accordingly, there is need for managing a vehicle fleet to facilitate increased availability or up-time by managing spare part inventory and technician availability based on weather or environmental factors.

SUMMARY OF THE INVENTION

A method and system for managing vehicles comprises gathering environmental data for potential mission locations. A data processing system collects vehicle data, including historical use data and maintenance data associated with corresponding vehicular components of vehicles within a fleet. A mission planner establishes a list of candidate missions for the fleet of vehicles. A stress module assigns a stress severity indicator to the established candidate missions based on the environmental data. The mission planner matches vehicles to corresponding missions based on the collected vehicle data and the stress severity indicator such that the matched vehicles are likely to complete the missions with a desired degree of reliability.

DESCRIPTION OF THE PREFERRED EMBODIMENT

Figure 1:
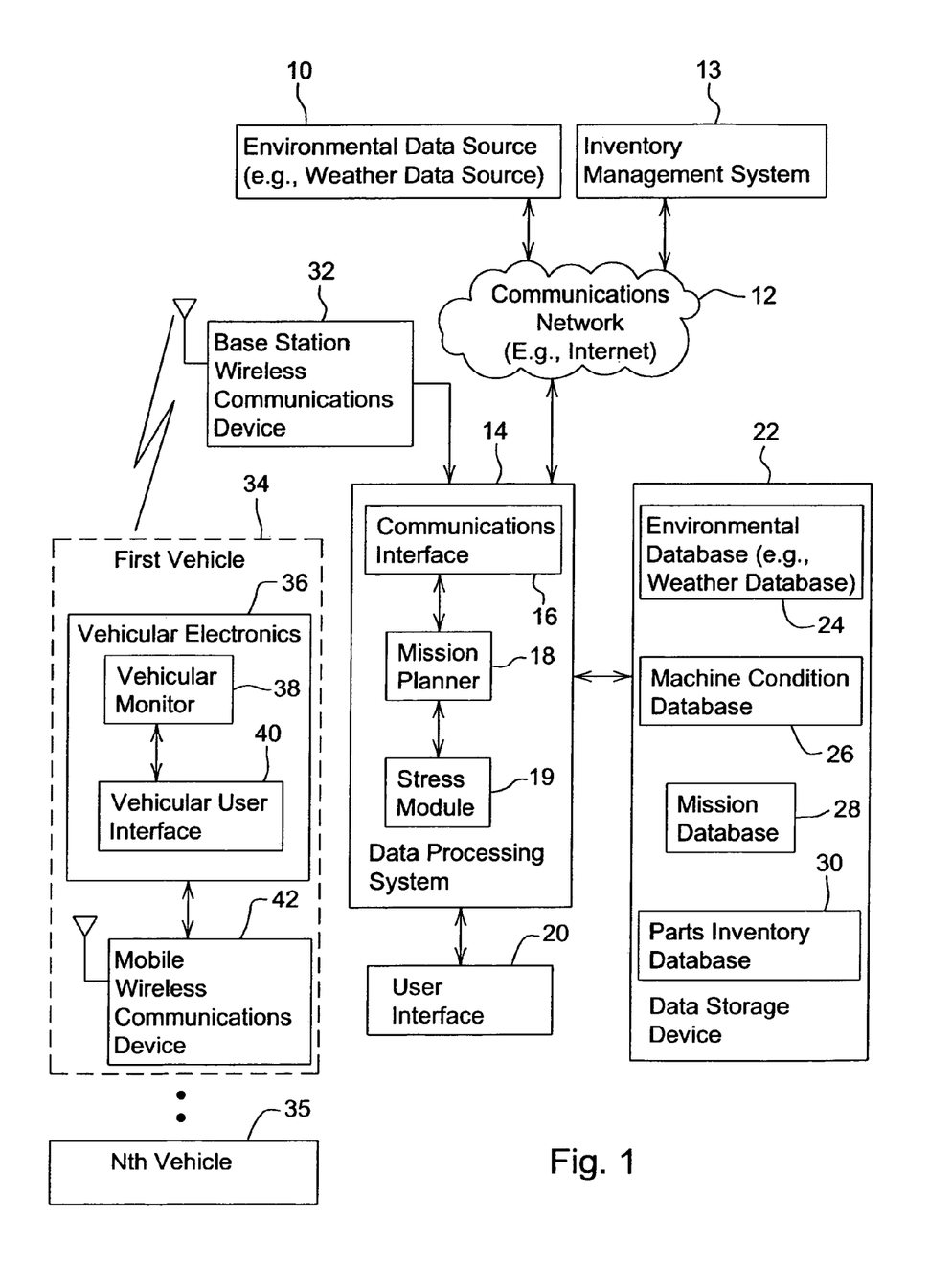
FIG. 1 is a block diagram of system for management of vehicles based on an operational environment.

In accordance with one embodiment of the invention, FIG. 1 shows a data processing system 14 for managing health of a fleet of vehicles. The data processing system 14 is associated with a data storage device 22 and a user interface 20. In one embodiment, the data storage device 22 comprises an environmental database 24, a machine condition database 26, a mission database 28, and parts inventory database 30. The user interface 20 may comprise any of the following: a keyboard, a keypad, a display, an electrical switch, a pointing device (e.g., mouse or trackball), a magnetic disk drive, an optical disk drive, a port for receiving memory, or another input/output device. The data processing system 14 may communicate with an environmental data source 10, an inventory management system 13, or both via a communications network 12 (e.g., the Internet). Further, the data processing system 14 may collect vehicle data and component data from a fleet or group of vehicles via a base station wireless communications device 32.

The vehicle data may comprise one or more of the following: machine condition data, vehicle status data, historical use data, maintenance data, component condition data, component status data, vehicle use data, vehicle repair data, component use data, component repair data, age data, vehicle age data, component age data, and remaining useful life data. The age may refer to the time that elapses from the date when a new replacement component is first installed (e.g., operationally and properly installed) on a vehicle to a present data or mission date. Alternately, the age may refer to the time that elapses from the manufacture of the component, regardless of when the component is actually installed on a vehicle. For instance, certain elastomers or rubber compounds may begin to deteriorate before installation on a vehicle, particularly if stored for extended periods of time. The remaining useful life may refer to the balance of the predicted life or longevity of a part based on its current age and/or cumulative stress severity indicator for one or more missions.

The fleet of vehicles may be defined as a first vehicle 34 through an Nth vehicle 35, where N represents any positive whole number greater than two. Each vehicle (34, 35) in the fleet may be associated with vehicular electronics 36 and a mobile wireless communications device 42. The vehicular electronics 36 includes vehicular monitor 38 and a vehicular user interface 40. The vehicular monitor 38 monitors the use (e.g., hours of use) and/or the age of the vehicle or components thereof, or otherwise collects vehicle data. The technician or worker may enter vehicle data, such as maintenance data or service input data, via the vehicular user interface 40. The vehicular user interface 40 or vehicular electronics 38 facilitates the identification of replaced components on the vehicle and the determination of the age or remaining useful life of replaced components, for example.

The mobile wireless communications device 42 is coupled to the vehicular electronics 36. The mobile wireless communications device 42 transmits vehicle data to the base station 32 via an electromagnetic signal (e.g., a radio frequency (RF) signal or microwave signal). The data processing system 14 may store the collected vehicle data in the machine condition database 26.

The communications interface 14 supports the gathering of environmental data associated with potential mission locations. Environmental data may comprise one or more of the following for potential or actual mission locations: weather data, a weather forecast, forecasted temperature, forecasted temperature range, forecasted precipitation, forecasted humidity, forecasted barometric pressure, forecasted wind speed or velocity, change in temperature per unit time, change in precipitation, change in humidity, and change in barometric pressure, change in barometric pressure per unit time, historical weather data, historical climate data, and other environmental parameters. Other environmental parameters may include whether the mission location is associated with the ocean, a body of salt water, a region of elevated background radiation, a desert region, or region where sand storms are possible. The environmental data source 10 may comprise one or more of the following: a weather station, a network of weather stations, a commercially available source of weather data, a governmental source of weather data, a website, the U.S. National Weather Service, the U.S. National Oceanic and Atmospheric Administration (NOAA), the Interactive Weather Information Network (IWIN), a geographic data source having coordinates of geographic features (e.g., salt water bodies, oceans, desert regions, artic areas), satellite images, aerial images, and reconnaissance images. In one example, the environmental data source 10 transmits or makes available environmental data (e.g., weather data) to the data processing system 14 or communications interface 14 via the communications network 12. The data processing system 14 may store gathered weather data in the environmental database 24.

The inventory management system 13 may comprise a barcode scanning system, a radio frequency identification (RFID) tag system, or another system for manually or automatically tracking inventory of repair parts for vehicles. Although the inventory management system 13 communicates to the data processing system 14 through the communications network 12 as shown, in other embodiments, the inventory management system 13 may be directly coupled to the data processing system 14 or via an intranet, a location communications network 12, or another communications link. The data processing system 14 may store the inventory data on parts for the vehicles in the parts inventory database 30.

A data processing system 14 collects vehicle data, including historical use data and maintenance data associated with corresponding vehicular components of vehicles within a fleet. For example, the vehicles (34, 35) regularly (e.g., periodically) transmit or otherwise (e.g., upon polling by the base station wireless communications device) transmit the vehicle data from the mobile wireless communications device 42 to the base station wireless communications device 32. In turn, the base station wireless communications device 32 provides the vehicle data to the data processing system 14.

In one embodiment, the data processing system 14 comprises a mission planner 18, a stress module 19, and a communications interface 16. The mission planner 18 establishes a list of candidate missions for the fleet of vehicles. For example, a user may input, enter or select information on candidate missions via the user interface 20. The definition and type of candidate missions primarily depend upon the organization and the work that the organization is involved with. The list of candidate missions and potential missions may be stored in the mission database 28. The mission database 28 may also store or contain references to historical mission data and reliability data for particular vehicles associated with the missions (e.g., historic missions or presently planned missions).

The stress module 19 assigns a stress severity indicator to the established candidate missions based on the environmental data. The stress module 19 may assign stress levels to missions in accordance with any of the following items: mission identifiers, mission locations, and corresponding mission times. The stress module 19 may store the assigned stress severity indicators in the mission database 28 or elsewhere. In one embodiment, the stress module 19 ranks missions based on the a stress severity indicator, where the stress severity indicator represents a sum of stress severities for at least one of thermal stress, heat stress, cold stress, precipitation stress, moisture stress, salt stress, fog stress, dust stress, snow stress, driving rain stress, heavy rain stress, icing stress, and radioactive stress. For example, the stress module 19 ranks missions with a highest stress indicator associated with encountering extreme temperatures during respective missions, where the extreme temperatures are defined as a temperature below negative 40 degrees Fahrenheit or above 110 degrees Fahrenheit.

In one embodiment, a cumulative stress severity indicator considers the cumulative stress on one or more components of a vehicle based on its historic execution of one or more missions, such that the cumulative stress indicator is available for the mission planner to match vehicles to corresponding missions or to achieve a desired level of reliability in the execution of an upcoming mission.

The mission planner 18 matches vehicles to corresponding missions based on the collected vehicle data and the stress severity indicator such that the matched vehicles are likely to complete the missions with a desired degree of reliability. For example, the user may select a certain percentage degree of reliability (e.g., 99 percent reliability or 95 percent reliability) for successful completion of the mission. To achieve such reliability it may be necessary to conduct maintenance (e.g., predictive or preemptive maintenance or repair) on vehicles to replace parts (e.g., parts subject to high usage, excessive age, or low reliability) that are vulnerable to environmental (e.g., weather) related stress associated with a corresponding mission.

The performance and safety of a number of vehicle components can be impacted by weather. For example, a battery may not turn the engine over in cold weather based on State of Health (SOH) and/or State of Charge (SOC) of the battery; tires may provide poor performance (e.g., slippage with reduced fuel economy and increased risk of accidents) in snow, ice, and water based on tread design and tread condition; diesel fuel may gel or become semi-solid state at cold temperature without fuel additives, which may cause fuel lines to freeze and become obstructed; cooling systems, such as fluids, hoses, and fans may fail (e.g., leak, burst or rupture) in extreme cold and hot conditions; a vehicle may start under cold or very cold conditions if equipped with an engine heater and plugged in to an electrical current source; and air filters can be consumed more quickly under dusty conditions, windy conditions, or smoky conditions.

Several data bases or other data storage structures are associated with the data storage device 22 to store data that is used, indirectly or directly, by the mission planner 18 to schedule missions with a desired degree of reliability. An environmental database 24 has weather forecasts for the mission area(s) or mission locations where a machine may be deployed on a mission. A machine condition database 26 has information on the condition of each vehicle in the fleet including estimates of the remaining useful life (RUL) of components/subsystems under normal and extreme weather conditions. The machine condition database 26 may get its information in real time through an automated telematics system, from data collected at a maintenance facility (e.g., via a technician entering data into the vehicular user interface 40) when the vehicle is there, from operator supplied reports, or a combination thereof. An automated telematics system may comprise a transceiver (e.g., a wireless radio, cellular radio) associated with a location-determining receiver (e.g., Global Positioning System (GPS) receiver), or the combination of the base station wireless communications device 32 and the mobile wireless communications device 42. A mission database 28 contains candidate missions for vehicles in the fleet. A parts inventory database 30 contains the inventory of parts where replacements are needed. The parts inventory database may, but need not, coordinate the provision of repair services to the vehicles via dealers providing services under service contracts, on-site technicians, mobile repair vehicles, or the like.

Figure 2:
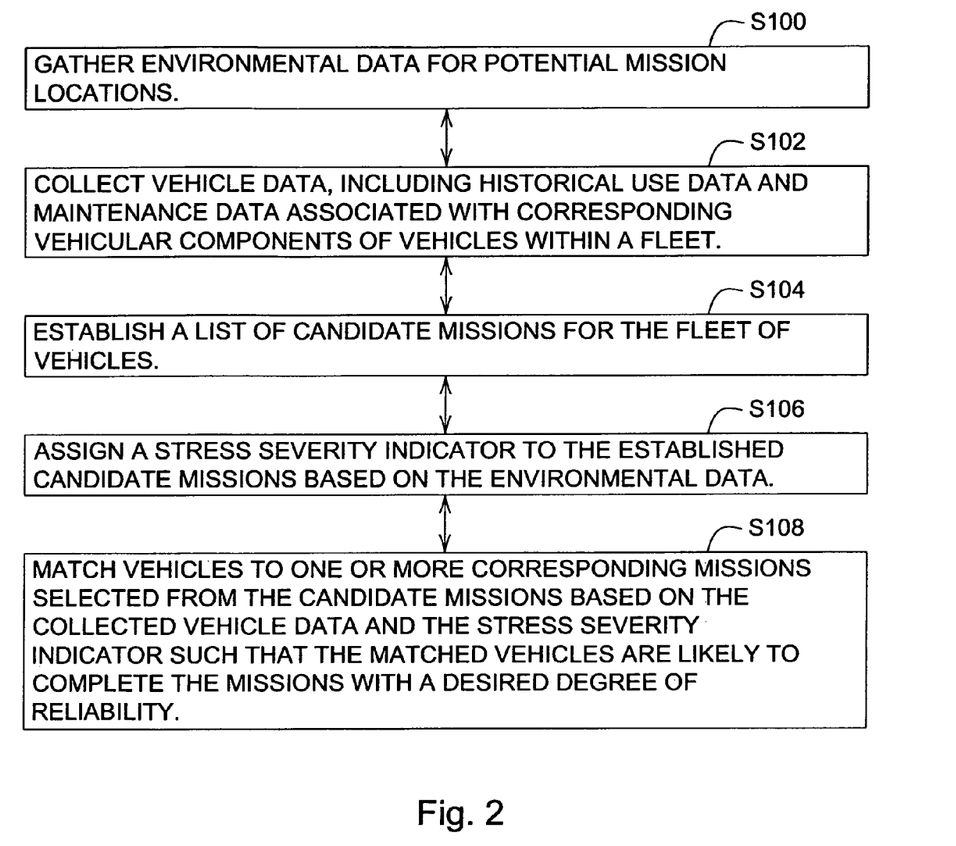
FIG. 2 is one embodiment of a method for managing vehicles based on an operational environment.

FIG. 2 shows a method for managing health of a fleet of vehicles. The method of FIG. 2 starts in step S100.

In step S100, the environmental data source 10 collects environmental data (e.g., weather data) for potential mission locations. For example, the environmental data source 10 may transmit the environmental data via a communications network 12 to a data processing system 14. The weather forecasts associated with corresponding mission locations may be stored in the environmental database 24 for subsequent retrieval or access.

In step S102, the vehicular electronics 36 collects vehicle data, including historical use data, maintenance data, vehicle quality data, and vehicle component quality data, and vehicle status data associated with corresponding vehicular components of vehicles within a fleet. For example, the vehicular electronics 36 may provide usage data on the use (e.g., hours of operation) of the vehicle. A technician may enter repair data on new components that have been added, or components that have been replaced in the vehicle. The usage data counter for a component may be reset upon replacement, for instance.

In step S104, a mission planner 18 or data processing system 14 establishes a list of candidate missions for the fleet of vehicles. The candidate missions may depend upon the organization in which the vehicles are used. The missions may comprise military missions, commercial missions, business missions, agricultural missions, forestry missions, commercial mowing missions, or the like.

In one example of carrying out step S104, the mission planner 18 identifies the missions that are available on a given day. For a truck transportation firm, this might be all the destinations for freight from a given freight terminal(s). For a construction project, it may be different tasks to be performed by a class of work vehicles, such as dozers, at different locations at a work site. This information populates the mission database 28.

In step S106, the stress module 19 assigns a stress severity indicator to the established candidate missions based on the gathered environmental data. In one embodiment, missions with weather stressors are identified along with the type of stress (e.g., heat, cold, snow, heavy rain, etc.), and the remainder of missions (if any) are considered normal. In another embodiment, the stress module 19 ranks missions based on the stress indicator, where the stress indicator represents a sum of stress severities for at least one of thermal stress, heat stress, cold stress, precipitation stress, moisture stress, salt stress, fog stress, dust stress, snow stress, driving rain stress, heavy rain stress, and icing stress. For example, the stress module 19 ranks missions with a highest stress indicator associated with encountering extreme temperatures during respective missions, where the extreme temperatures are defined as a temperature below negative 40 degrees Fahrenheit or above 110 degrees Fahrenheit.

In step S108, the mission planner 18 matches vehicles to one or more corresponding missions selected from the candidate missions based on the collected vehicle data and the stress severity indicator such that the matched vehicles are likely to complete the missions with a desired degree of reliability.

Step S108 may be carried out in accordance with various algorithms for matching vehicles, and optionally drivers, with the available missions. The algorithms or components thereof, may be expressed as the following procedures, which may be applied alternately or cumulatively. Under a first procedure, the mission planner 18 prioritizes (or sorts) missions based on a stress indicator (e.g., mission harshness number). The mission harshness number may represent the sum of stress severities for each type of stress (e.g., heat, cold, snow, heavy rain, other environmental events), where a severity scale might indicate the relative levels of stress (e.g., within a range from 0-4 with 0 meaning no stress and 4 meaning the maximum stress).

Under a second procedure, for each mission in the prioritized list of the first procedure, the mission planner 18 evaluates the ability of vehicles, based on data in the machine condition database to best/adequately complete the missions in accordance with a "first fit" model. Under a first fit model the mission planner 18 places a mission or incoming task in the first opening in a schedule that is large enough to hold it. For example, a first fit model may comprise pairing a vehicle or machine (or a pair of vehicle and driver) with the first mission in the sorted mission list that it can perform with a desired degree of reliability. First fit algorithms may be executed rapidly.

Under a third procedure, for each mission in the prioritized list of the first procedure, the mission planner 18 evaluates the ability of vehicles (or pair of vehicle and driver), based on data in the machine condition database to best/adequately complete the missions in accordance with a "best fit" model. For example, under a best fit model a mission planner 18 places an incoming task or mission in an open section of a schedule that fits most tightly with respect to other missions, or leaves the smallest amount of unused time with respect to other incoming tasks. A best fit model may comprise a directed trial-and-error optimization method such as a genetic algorithm that pairs machines and missions (or pairs of vehicles and drivers) to provide nearly the maximum fleet reliability. The potentially greater computation time or computational resources required for optimization under the best fit model may be weighed against the benefits of any potentially increased reliability over the first fit model.

Under a fourth procedure, the mission planner 18 indicates that missions that might encounter extreme temperatures (e.g., temps below −40 degrees Fahrenheit or above 110 degrees Fahrenheit) are indicated as having the highest stress level or stress indicator. Under a fifth procedure, the mission planner 18 evaluates the ability of vehicles based on machine condition data or a function of vehicle data (e.g. vehicle status data) and environmental data (e.g., weather data) to complete the ranked missions.

The procedures of step S108 may be better explained with reference to the following illustrative example, all other examples and scenarios fall within the scope of the invention. Assume that the missions represent assignments for a hypothetical truck freight terminal in St. Louis, Mo. might include the following: (i) a first truck without antifreeze and poor tire tread depth is sent on a mission to the warm and dry southwest; (ii) a second truck with antifreeze and an engine heater is sent on a mission to Fargo, N. Dak.; and (iii) a truck with little antifreeze, good tire tread design, and good tire tread depth is sent on a mission to the southeast where heavy rains are expected.

The method of FIG. 2 can be used in a batch situation where the method is performed on a periodic basis, such as once a day for the fleet, or on a continuous basis as vehicles become available for new missions. For example, the method of FIG. 2 may be performed as a batch mode once a day before the start of the work day.

Figure 3:
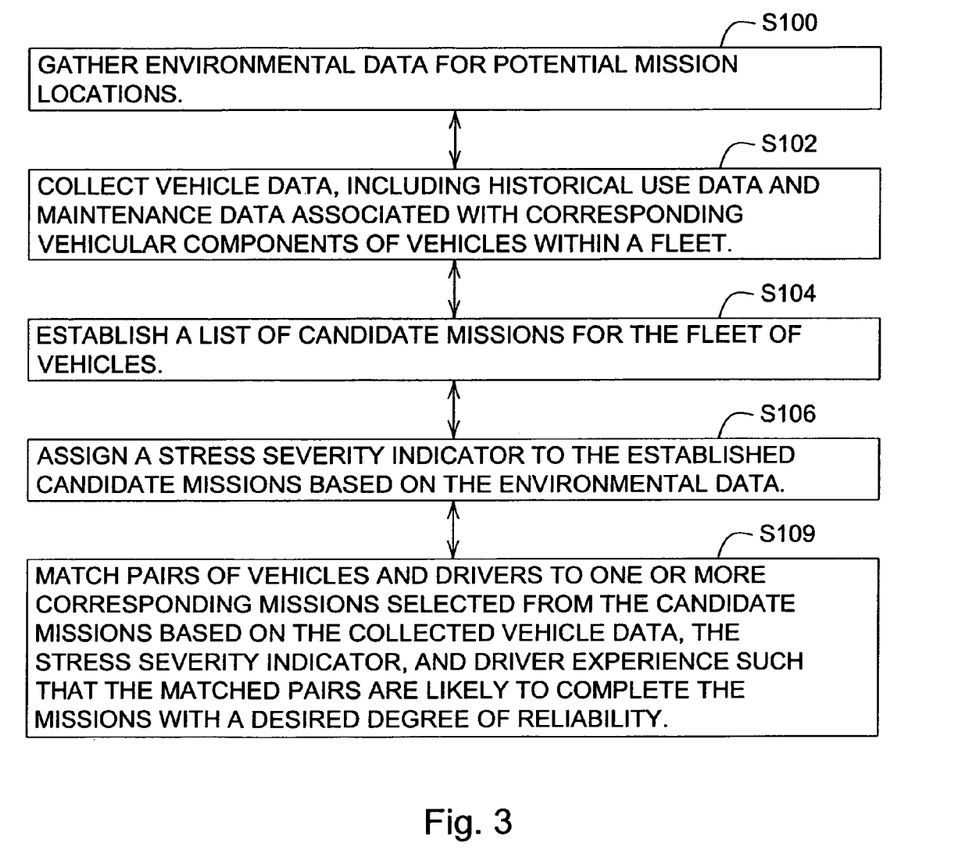
FIG. 3 is another embodiment of a method for managing vehicles based on an operational environment.

The method of FIG. 3 is similar to the method of FIG. 2, except the method of FIG. 3 replaces step S108 with step S109. Like reference numbers in FIG. 2 and FIG. 3 indicate like procedures or steps.

In step S109, a mission planner 18 matches pairs of vehicles and drivers to one or more corresponding missions selected from the candidate missions based on the collected vehicle data, the stress severity indicator, and driver experience such that the matched pairs are likely to complete the missions with the desired degree of reliability. For instance, driver assignments can be made based on driver experience with those drivers with the greatest experience in snow or heavy rains assigned to missions that take advantage of that experience, while less experienced drivers are assigned to more mundane missions. In one embodiment, the data storage device 22 may further comprise an optional operator experience database that contains information on operators and their past performance and/or experience in driving in special conditions like heavy rain, snow, and ice.

Figure 4:
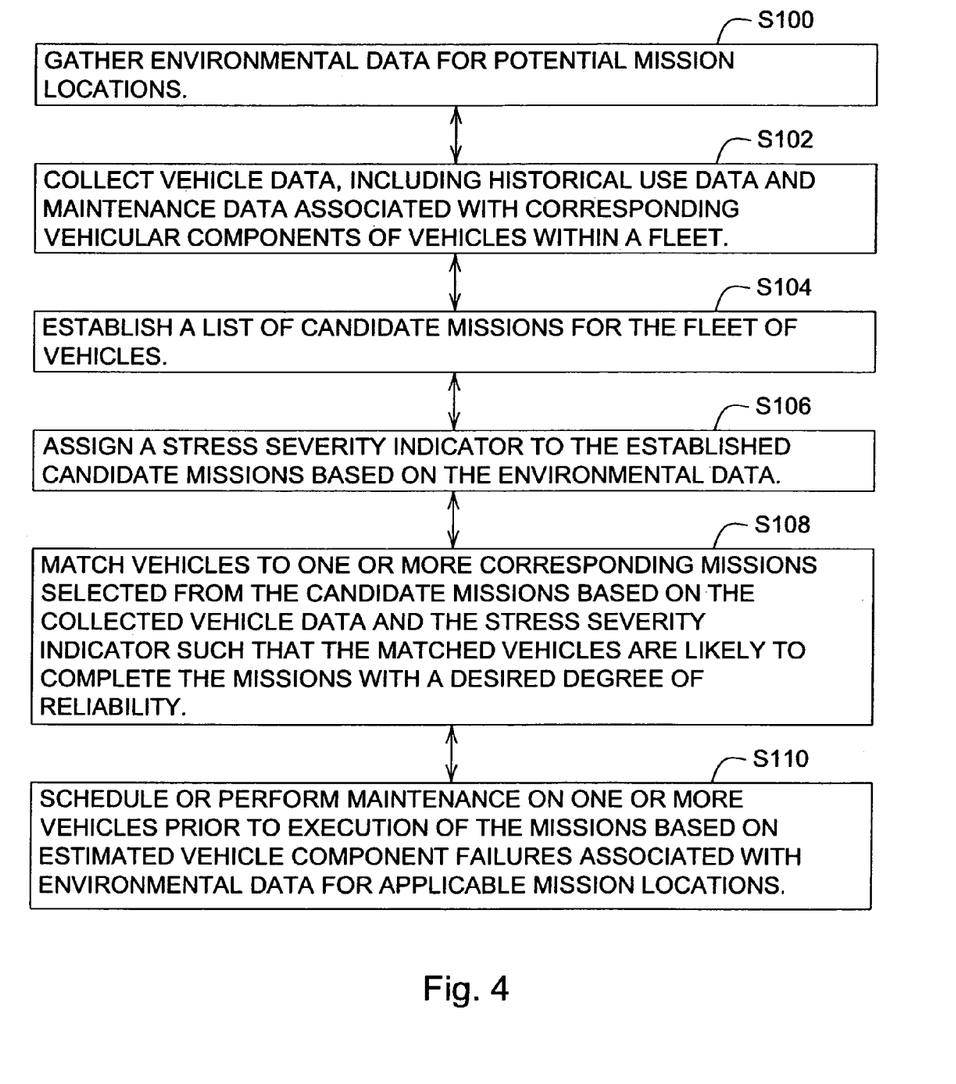
FIG. 4 is yet another embodiment of a method for managing vehicles based on an operational environment.

The method of FIG. 4 is similar to the method of FIG. 2, except the method of FIG. 4 adds step S110. Like reference numbers in FIG. 2 and FIG. 4 indicate like procedures or steps.

In step S110, the mission planner 18 or scheduler schedules or performs maintenance on one or more vehicles prior to execution of the missions based on estimated vehicle component failures associated with the environmental data for applicable mission locations. That is, based on the mission assignments made in step S108, the environmental data (e.g., weather information) for each mission and the vehicle data (e.g., status or condition) of the vehicle assigned to each mission are used to estimate a weather-impacted number of vehicle component failures. The expected part requirements for the vehicles may be expressed as a function of both environmental data (e.g., weather) and vehicle data (e.g., status or vehicle condition). The expected part requirements are compared with inventory data on those parts (and optionally availability of technicians) to meet the anticipated part requirements or need.

Step S110 may be carried out in accordance with various techniques that may be applied, alternately or cumulatively. Under a first technique, to achieve a desired reliability of the vehicle in the performance of a mission, the mission planner 18 may do one or more of the following: (a) schedule or trigger the scheduling of the performance of preventative maintenance at vehicle's current location so that the vehicle will be less likely to fail in the environmental stressed area of the mission; and (b) deploy or trigger the deployment of additional parts for components that may fail during or after a mission.

Under a second technique, if parts and labor are readily available relative to expected demand for such parts and labor, a number of actions may be taken including one or more of the following: (a) performing preventive maintenance at a vehicle's current location (e.g., coolant change, tire change) so that it will be less likely to fail in the weather-stressed area of the mission; (b) deploying additional parts (and optionally technicians) to the locations where they are likely to be needed; (c) renting or leasing a vehicle better suited for the weather-stressed mission. It may be cheaper to rent than to have an on-hand vehicle experience an un-scheduled failure or accident due to weather.

Weather can impact when a vehicle will fail and experience unscheduled downtime. The duration of the downtime can depend on the availability of spare parts. Harsh weather can cause a spike in demand for parts and repairs that are stressed by the weather. This method and system for managing vehicle fleets for increased up time by (1) considering the health of vehicles before deploying them into harsh weather conditions and (2) insuring a supply of spare parts and technician time if vehicles have to be used under harsh conditions. Application of this invention can be made to air, water, and ground vehicles. The focus of this description will be on ground vehicles, but those skilled in the art will make the application to air and water vehicles.

Figure 5:
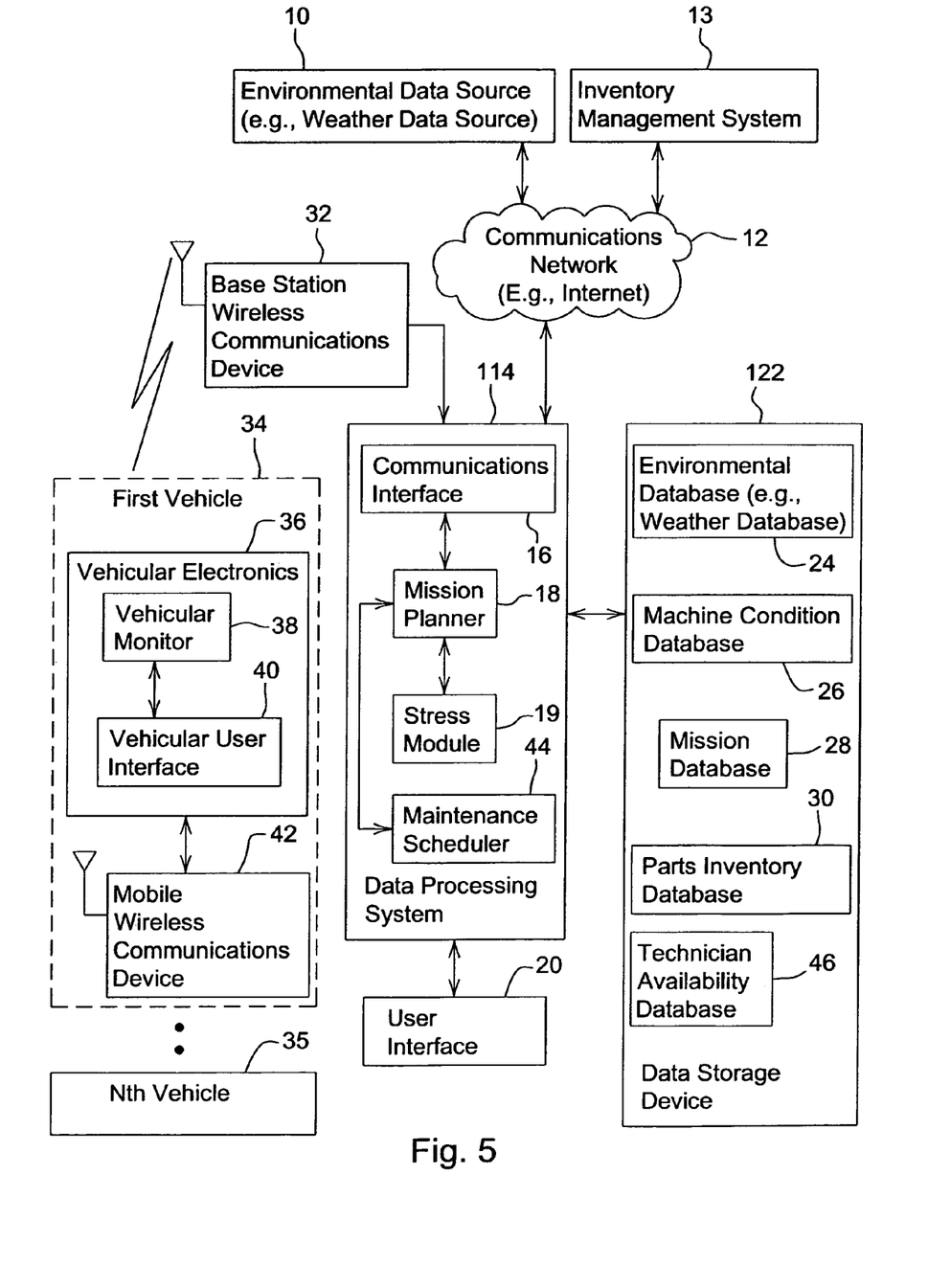
FIG. 5 is a block diagram of another embodiment of a system for management of vehicles based on an operational environment.

The configuration of FIG. 5 is similar to the configuration of FIG. 1, except the configuration of FIG. 5 includes a maintenance scheduler 44 and a technician availability database 46. Like reference numbers in FIG. 5 and FIG. 1 indicate like elements.

The data processing system 14 comprises a maintenance scheduler 44 and the data storage device 22 comprises a technician availability database 46. The technician availability database 46 may contain a schedule of technicians that are available to complete maintenance work on a vehicle at a particular location and time range. The maintenance scheduler 44 may access the parts inventory database 30, the technician availability database 46, and the mission database 28 to determine when and where to schedule maintenance activity prior to a mission to provide a desired degree of reliability to the execution of a mission.

The method and system advantageously considers not only weather, but also fleet vehicle condition, in assigning vehicles to missions and in managing weather-impacted parts inventory. The value to businesses, governmental entities, transportation businesses, shipping firms, agricultural firms, construction firms, or other organizations that manage fleets of vehicles include (1) reduction in unscheduled downtime by assigning vehicles least likely to have weather-related problems to missions, (2) reduction in unscheduled downtime by having parts and technicians on-hand to repair weather-related breakdowns, and (3) reduction in inventory costs by deploying inventory not only based on forecasted weather, but also the condition of vehicles operating in the weather-impacted areas.

Having described the preferred embodiment, it will become apparent that various modifications can be made without departing from the scope of the invention as defined in the accompanying claims.

The invention claimed is:

1. A method for managing fleet health of vehicles, the method comprising:
   gathering environmental data for potential mission locations;
   collecting vehicle data, including historical use data and maintenance data associated with corresponding vehicular components of vehicles within a fleet;
   establishing a list of candidate missions for the fleet of vehicles;
   assigning a stress severity indicator to the established candidate missions based on the environmental data; and
   matching vehicles to one or more corresponding missions selected from the candidate missions based on the collected vehicle data and the stress severity indicator such that the matched vehicles are likely to complete the missions with a desired degree of reliability.

2. The method according to claim 1 wherein the matching comprises matching pairs of vehicles and drivers to one or more corresponding missions selected from the candidate missions based on the collected vehicle, the stress severity indicator, and driver experience such that the matched pairs are likely to complete the missions with a desired degree of reliability.

3. The method according to claim 1 further comprising:
   scheduling maintenance on one or more vehicles prior to execution of the missions based on estimated vehicle component failures associated with environmental data for applicable mission locations.

4. The method according to claim 3 further comprising ranking missions based on the a stress indicator, the stress indicator representing a sum of stress severities for at least one of thermal stress, heat stress, cold stress, precipitation stress, moisture stress, salt stress, fog stress, dust stress, snow stress, driving rain stress, heavy rain stress, and icing stress.

5. The method according to claim 4 further comprising evaluating the ability of vehicles based on machine condition data to complete the ranked missions.

6. The method according to claim 3 further comprising ranking missions with a highest stress indicator associated with encountering extreme temperatures during respective missions, the extreme temperatures defines as a temperature below negative 40 degrees Fahrenheit or above 110 degrees Fahrenheit.

7. The method according to claim 1 wherein the environmental data comprises weather forecasts.

8. The method according to claim 1 further comprising:
performing preventative maintenance at vehicle's current location so that the vehicle will be less likely to fail in the environmental stressed area of the mission.

9. The method according to claim 1 further comprising:
deploying additional parts for components that may fail during or after a mission.

10. The method according to claim 1 wherein the stress indicator comprises a cumulative severity stress indicator.

11. A system for managing fleet health of vehicles, the system comprising:
an environmental data source for gathering environmental data for potential mission locations;
vehicular electronics for collecting vehicle data, including historical use data and maintenance data associated with corresponding vehicular components of vehicles within a fleet;
a stress module assigning a stress severity indicator to the established candidate missions based on the environmental data; and
a mission planner for establishing a list of candidate missions for the fleet of vehicles; the mission planner matching vehicles to one or more corresponding missions selected from the candidate missions based on the collected vehicle data and the stress severity indicator such that the matched vehicles are likely to complete the missions with a desired degree of reliability.

12. The system according to claim 11 wherein the mission planner matches pairs of vehicles and drivers to one or more corresponding missions selected from the candidate missions based on the collected vehicle, the stress severity indicator, and driver experience such that the matched pairs are likely to complete the missions with a desired degree of reliability.

13. The system according to claim 11 further comprising:
a maintenance scheduler for scheduling maintenance on one or more vehicles prior to execution of the missions based on estimated vehicle component failures associated with environmental data for applicable mission locations.

14. The system according to claim 11 wherein the stress module ranks missions based on the a stress indicator, the stress indicator representing a sum of stress severities for at least one of thermal stress, heat stress, cold stress, precipitation stress, moisture stress, salt stress, fog stress, dust stress, snow stress, driving rain stress, heavy rain stress, and icing stress.

15. The system according to claim 11 wherein the mission planner evaluates the ability of vehicles based on machine condition data to complete the ranked missions.

16. The system according to claim 11 wherein the stress module ranks missions with a highest stress indicator associated with encountering extreme temperatures during respective missions, the extreme temperatures defines as a temperature below negative 40 degrees Fahrenheit or above 110 degrees Fahrenheit.

17. The system according to claim 11 wherein the environmental data comprises weather forecasts.

18. The system according to claim 11 further comprising:
a maintenance scheduler for performing preventative maintenance at vehicle's current location so that the vehicle will be less likely to fail in the environmental stressed area of the mission.

19. The system according to claim 11 further comprising:
a maintenance scheduler for deploying additional parts for components that may fail during or after a mission.

* * * * *